Nov. 17, 1959  F. H. JOHNSON ET AL  2,912,735
DIAPER FASTENER
Filed Feb. 14, 1957

INVENTORS:
FRANCES H. JOHNSON &
EMANUEL J. JOHNSON, JR.
BY
ATTORNEY

United States Patent Office 2,912,735
Patented Nov. 17, 1959

2,912,735

DIAPER FASTENER

Frances H. Johnson and Emanuel J. Johnson, Jr., Fernandina Beach, Fla., assignors to Tidy-Pin Company, Inc., Fernandina Beach, Fla., a corporation of Florida Application February 14, 1957, Serial No. 640,192

1 Claim. (Cl. 24—87)

This invention relates to a diaper fastener.

A general object of the invention is to provide an improved fastening device for infant diapers.

A specific object of the invention is to provide a secure diaper fastening device arranged to avoid the danger of injury to the infant which so often occurs from the point of a pin type attachment device.

A further object is to improve the safety of quick-attachable and detachable diaper fastening devices by providing a device having minimized tendency to being pulled out of the diaper, which is less likely to be swallowed by the infant, and which has no long, sharp, weak or bendable pin shaft.

An additional object of the invention is to provide a fastening device which need not be set or operated in any manner to guard the point, which is easily and quickly attached to and removed from the diaper and which provides a completely secure fastening for the diaper when in place.

The most common present fastening device for infant diapers is the safety pin. A safety pin, being, when open, similar in shape to and a known substitute for a fishhook, has proved to be somewhat less safe than its name implies. To attach a safety pin to a diaper, it is, of course, necessary to force the point and shank of the pin through several thicknesses of diaper material in a direction toward the infant's skin, or toward a finger so held that, when the point of the pin suddenly emerges from the material, the point sticks into the finger instead of the baby. Once the pin is locked in place, pull on the diaper is likely to spring or bend the shank sufficiently to release the point from the hood. Such bending of the shank results from the use of a pin formed of sufficiently small diameter wire to permit a person of reasonable muscular strength to force the shank through the diaper material. The present invention contemplates a diaper fastener which embodies sharp-pointed tines, in the general nature of pins, but which, in the construction herein disclosed, are sufficiently thick to be highly resistant to bending or deformation, the arrangement being such, however, that the device may be applied with less force than is necessary with a safety pin. The present construction has the further advantage that no pushing of the point of the device toward the infant or toward an infant-protecting finger is necessary, and, moreover, wherein the points are appropriately guarded at all times without any necessity of engaging any parts or moving any part with respect to another. Specifically, the device according to this invention cannot assume the aspect of a fishhook, and it is less likely to be swallowed than a safety pin, such as it may replace, and if swallowed, or if carelessly handled by a baby, for example, injury to the baby would be less likely of occurrence and of less danger of being serious.

The novel features which are believed to be characteristic of this invention are set forth with particularity in the appended claim. The invention itself, however, both as to its organization and method of operation, together with further objects and advantages thereof, may best be understood by reference to the following description taken in connection with the accompanying drawing, in which:

Figure 1:
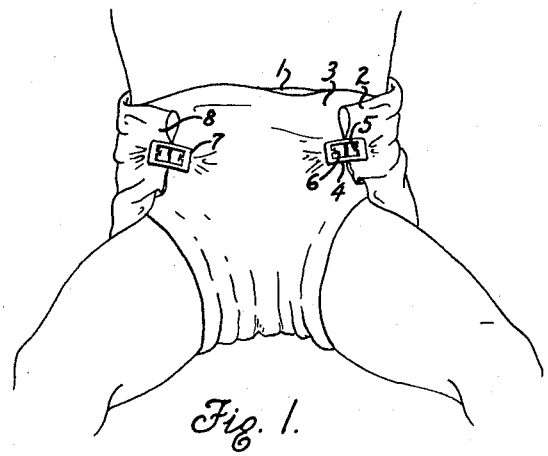
Fig. 1 is a view of the hips of an infant with a diaper held in place thereon by two diaper fasteners in accord with the invention.

As seen in Fig. 1 the diaper 1 has, at one side, an end portion 2 drawn forwardly to overlap the front portion 3 of the diaper, and fastener 4 is applied with a tine 5 engaged into end portion 2 and with an opposite tine 6 engaged into the front body portion 3 of the diaper, retaining these diaper portions in the relative positions shown. A second diaper fastener 7 shown in Fig. 1 is in all respects identical to fastener 4 and is applied to connect diaper end portion 8 to front body portion 3.

Figure 2:
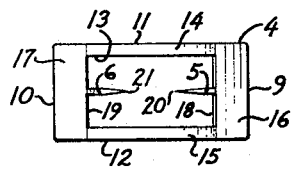
Fig. 2 is a plan view of the fastener according to the invention.
Figure 3:
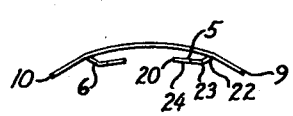
Fig. 3 is a side elevation of the fastener.

The fastener 4, as shown in greater detail in Figs. 2 and 3, comprises a sheet metal member which may be formed, for example, of .020 inch thick stainless steel sheet material. The fastener device is of generally rectangular outline having opposite ends 9 and 10 and side edges 11 and 12. A generally rectangular aperture 13 centered with respect to the member forms side edge rail portions 14 and 15 which interconnect end portions 16 and 17. Aperture 13 is defined between inner edges 18 and 19 of end portions 16 and 17, respectively, and the length of aperture 13 between edges 18 and 19 is preferably equal to substantially two-thirds of the overall length of the member between ends 9 and 10. Thus the end portion 16 extends inwardly from end 9 to edge 18 a distance equal to substantially one-sixth of the overall length dimension of the member. End portion 17 is preferably identical in proportion to end portion 16. Side portions 14 and 15 each have a width which is sufficient to provide suitable strength and resistance to bending of the member 4, but these portions should be sufficiently small, or narrow, to permit an aperture width sufficient to receive the tip of a finger of the hand and to receive several thicknesses of diaper material while providing an overall width of the member, as measured between side edges 11 and 12, sufficiently narrow for comfort of the infant. The width of aperture 13, accordingly, should be not appreciably less than one-half inch and should, preferably, not exceed three-fourths of an inch, while three thirty-seconds of an inch has been found a satisfactory width for each side rail portion 14 and 15. The overall length of the pin, between ends 9 and 10, may be one and one-half inches, and the aperture may be one inch in length.

A pair of tines 5 and 6 extend generally inwardly from the inner edges 18 and 19 of the respective end portions, the tines being preferably identical and terminating inwardly in sharp, cloth-piercing points 20 and 21 respectively. The points are separated, in an exemplary construction, by a distance of a little less than one-half of an inch, and the distance between the points should be at least as much as one-half the width dimension of the aperture 13.

As best seen in Fig. 3, end portions 16 and 17 extend inwardly and inclinedly upwardly at an angle of approximately thirty degrees to the horizontal, the overall shape of the member 4 from end-to-end conforming generally to an arch of approximately sixty degrees of arc. This arch-like shape of the device is sufficient to dispose the edges 18 and 19, identified in Fig. 2, at a level approximately one-eigthth inch higher than the level of the ends 9 and 10. Each tine extends inwardly and inclinedly downwardly for a distance of approximately one-eighth inch forming thereby a heel portion of the tine, such as heel portion 22 of tine 5. The heel portion approaches to within approximately three thirty-seconds of an inch of the level of ends 9 and 10. Inwardly of heel 22, tine 5 further extends, from bend 23, inwardly and inclinedly upwardly, at an angle, for example, of approximately ten degrees to the horizontal, to form cloth-penetrating barrel portion 24 terminating finally in point 20.

Figure 4:
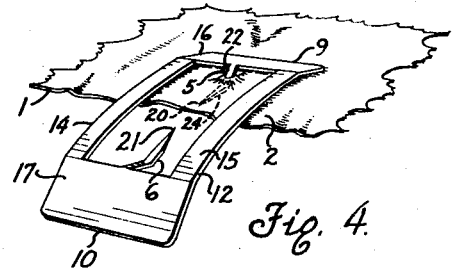
Fig. 4 is a perspective view on a slightly enlarged scale showing the method of attachment of the fastener to the diaper material.

The method of attachment and use of the device 4 will be further understood from Fig. 4, wherein tine 5 is seen to be engaged in portion 2 of diaper 1. The point 20 of the tine has been inserted into the diaper fabric sufficiently to imbed barrel portion 24 therein and to pull the fabric up against heel portion 22. When the fastener has been secured in this manner to end portion 2 of the diaper, the device may be brought into appropriate position to similarly engage tine 6 in front portion 3 of the diaper, as shown in Fig. 1.

The initial penetration of the tine point 20 or 21 in the diaper material may require some pressure against the material from a finger of the hand to bring an appropriate section of the material into position for piercing by the tine point. Accordingly, the spacing of side rails 14 and 15 should be at least about one-half inch and the distance between points 20 and 21 should be at least about one-quarter of an inch. The distance between points 20 and 21 should, however, be limited to less than about one-half inch, since a greater spacing might make possible contact between a point and the body of the infant, while, for the same reason, and to provide a convenient overall width of the device, the aperture width should be substantially less than one inch.

It will be noted, particularly from Fig. 3, that the whole of each tine is held suspended above the level of the ends 9 and 10 of the device. It will be further noted that the barrel or cloth-penetrating body portions of the tines, such as portion 24 of tine 5, incline slightly upwardly, as at an angle to the horizontal of about 10 degrees, away from the body of the infant. Thus each tine is of a sufficient length, from bend 23 to point 20, to engage firmly, in the manner of an elongated pin, in the diaper material, yet the pin or tine points are maintained at a safe distance, and pointed away, from the body of the infant. The tines are tapered to provide a point which is sharp and which will penetrate with application of reasonable force into the diaper material and which will easily slide out of the material when detachment is to be accomplished.

Any pulling apart of the diaper portions 2 and 3 tends, of course, to pull the fabric more firmly against the tine heels, while pulling of the device outwardly, i.e. directly away from the infant's body, has the same effect. Inadvertent release of the fastener is thus highly unlikely, while a mere sliding forward of the diaper material with respect to either tine permits ready detachment of the material and quick removal of the device. The device may be readily applied, in practice, with only one hand, moving the fastener first against one portion of the diaper, such as portion 2, until the point 20 of tine 5 becomes engaged therein, and then manipulating the fastener against diaper portion 3 until the point 21 of tine 6 catches in this latter portion. Tension subsequently applied will, as explained above, tend to make increasingly firm and secure the engagement of the tines in the respective diaper portions, and it is not necessary to push with the finger against the tine point at any time, and, thus, stabbing of the finger is eliminated.

The device may be stamped from 0.020″ stainless steel sheet material to have exemplary dimensions as follows. The overall length may be one and one-half inches, the width may be three-quarters of an inch, the side rail portions may be three thirty-seconds of an inch wide, and the heel portions of the tines may be three sixty-fourths of an inch wide. The tines may be, before forming into the curved or bent configuration shown in Fig. 3, about five-sixteenths of an inch long, and, when formed, may have their points spaced about one-quarter of an inch from the inner edge of the respective end portion. The distance between the tine points in the completed device may be, accordingly, nearly one-half inch or, specifically, seven-sixteenths of an inch. The space or distance from each tine to each side rail portion may be one-quarter of an inch, and the tines may have widths at the bends 23 thereof of three sixty-fourths of an inch. The width of the aperture, or the distance between the side rails, may be substantially one-half inch. The lowermost parts of the tines are higher by approximately three thirty-seconds of an inch than the level of the ends of the device. The heel portion of each time may comprise about one-third of its overall length and it may extend inwardly and downwardly at approximately 30 degrees to the horizontal, while the inner portion of the tine, such as between bend 23 and point 20 of tine 5, may extend inwardly and upwardly at the small angle of about 10 degrees to the horizontal. End portions 16 and 17 may extend inwardly and upwardly at substantially 30 degrees to the horizontal, while the connecting rails 14 and 15 bridge in an arch or arcuate manner between the end portions. The arc of the rail portions may be defined by a radius of approximately one and one-half inches, corresponding to an arc of about 38 degrees between edges 18 and 19. The uppermost portion of the side rails may extend to approximately three-sixteenths of an inch above the level of the ends of the device.

While only a certain preferred embodiment of this invention has been shown and described by way of illustration, many modifications will occur to those skilled in the art and it is, therefore, desired that it be understood that it is intended in the appended claim to cover all such modifications as fall within the true spirit and scope of this invention.

What is claimed as new and what it is desired to secure by Letters Patent of the United States is:

A diaper fastener comprising a generally rectangular rigid sheet metal member arched from one end edge to the opposite end edge and having an over-all length dimension between said end edges approximately one and one-half times its width dimension, said member being centrally apertured and including opposite end portions defined between said central aperture and the respective end edges of said member and further including narrow side rail portions lying on opposite sides of said aperture bridging upwardly between and connecting said end portions, said end edges of said member defining a plane, each said end portion extending from the respective end edge of said member for a distance equal to between substantially one-eighth to one-fifth of said over-all length dimension inwardly and inclinably upwardly at approximately thirty degrees with respect to said plane of said end edges and each said end portion terminating inwardly at a respective inner edge thereof at said aperture, said aperture having a length dimension between said respective inner edges equal to approximately two-thirds of said over-all length dimension of said member, a respective single tine affixed to each said end portion centrally of and at said inner edge thereof and extending therefrom midway between said side rail portions into said aperture inwardly and downwardly to form a heel portion of the respective tine and thence inclinably upwardly and inwardly at an angle to said plane of substantially ten degrees and terminating inwardly in a respective cloth-piercing point, said points being separate one from the other by a distance equal to approximately one-third of the length dimension of said aperture, each said heel portion comprising less than one-half of the over-all length of the respective tine, said tines lying wholly above said plane of said end edges of said member, said aperture being completely open between each said tine and each said side rail portion and between said points thereby freely to receive substantial portions of diaper material surrounding the area thereof which is penetrated by each said tine.

References Cited in the file of this patent

UNITED STATES PATENTS

| | | |
|---|---|---|
| 1,248,450 | Burke | Dec. 4, 1917 |
| 1,921,999 | Dickinson | Aug. 8, 1933 |

FOREIGN PATENTS

| | | |
|---|---|---|
| 18,612 | Great Britain | 1905 |
| 957,110 | France | Aug. 22, 1949 |